Dec. 13, 1960  J. S. STELZER  2,964,311
AIR SPRING CONTROL VALVE
Filed April 12, 1957  2 Sheets-Sheet 1
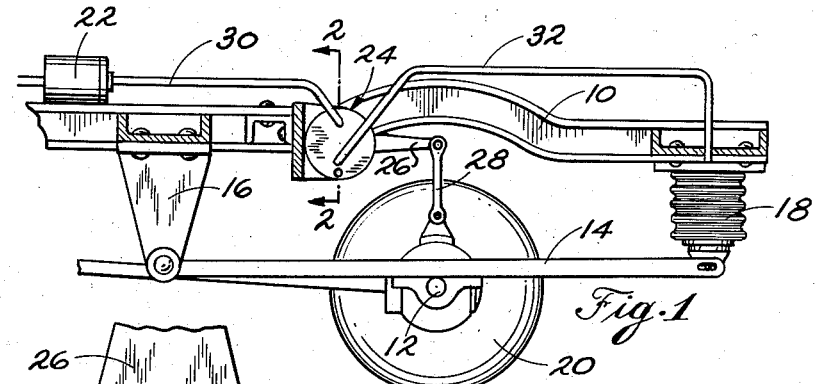
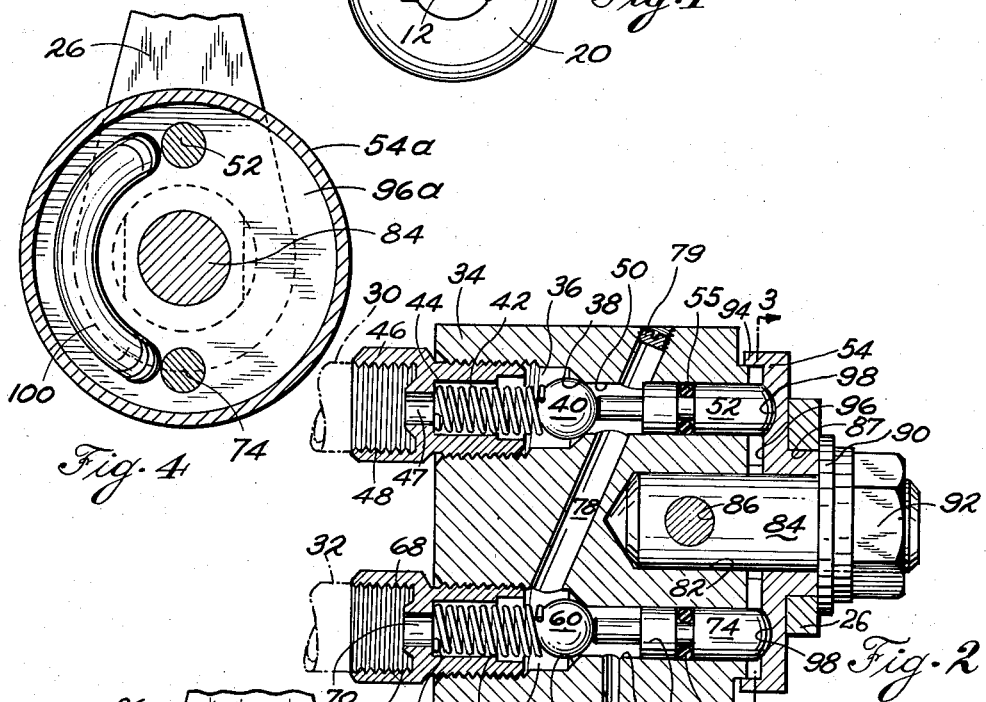
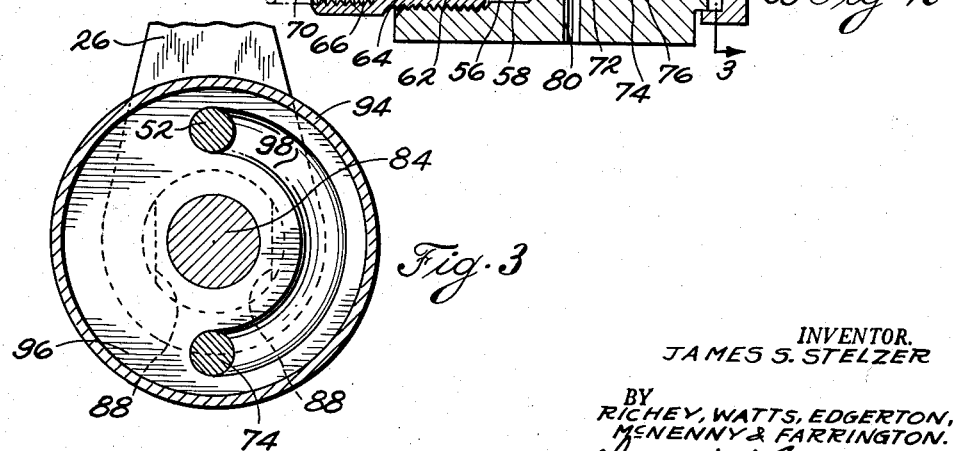
INVENTOR.
JAMES S. STELZER
BY
RICHEY, WATTS, EDGERTON,
McNENNY & FARRINGTON.
ATTORNEYS

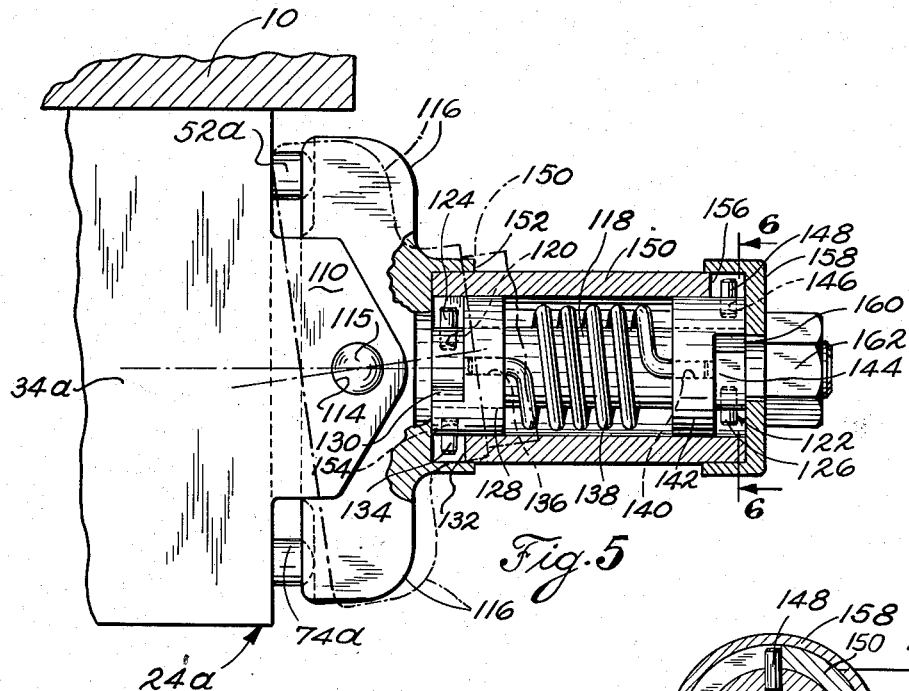
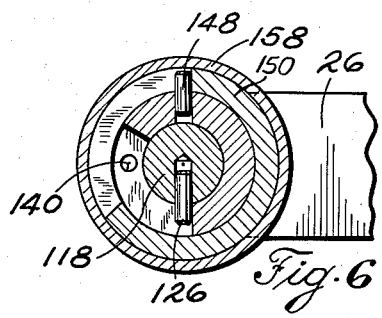
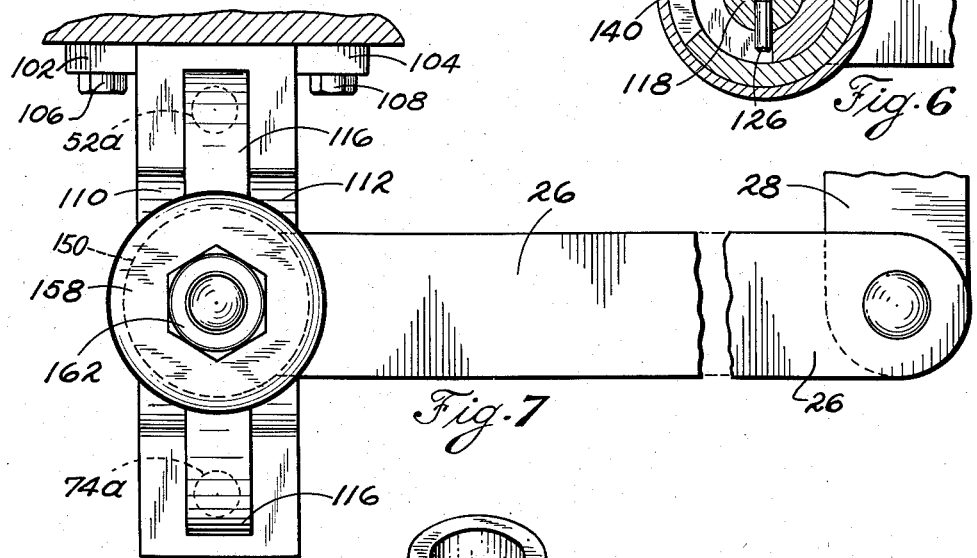
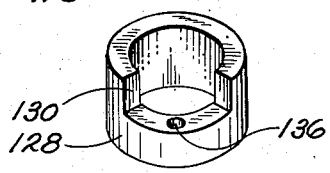

United States Patent Office 2,964,311
Patented Dec. 13, 1960

2,964,311

AIR SPRING CONTROL VALVE

James S. Stelzer, Fort Wayne, Ind., assignor to The Weatherhead Company, Cleveland, Ohio, a corporation of Ohio Filed Apr. 12, 1957, Ser. No. 652,394

6 Claims. (Cl. 267—65)

This invention relates to automatic control for vehicle suspension systems, and more particularly to a valve device operable in an automatic controlling system for maintaining constant the effective working range of a vehicle suspension system irrespective of the vehicle load.

Broadly, this invention comprehends the provision of a valve incorporating a pair of channels selectively opened or closed by a novel cam means in accordance with the position of a vehicle chassis relative to its axle, to control the flow of air through the channels for applying corrective influences to a vehicle air spring and consequently for maintaining constant the relative average position between chassis and axle of the vehicle.

As is well known, many vehicles such as automobiles, buses and the like, are subject to rather widely varying loads and the spacing between such vehicle chassis and axle varies greatly in accordance with the load carried. It is, of course, desirable to maintain an approximately even spacing between chassis and axle of a vehicle so as to maintain certain specifications of height, appearance and operation of the same. If such vehicles are operated without compensating controls such as the system herein, the vehicle chassis will be too high or too low with respect to the vehicle axle at extremes of loading. Heavy loads may cause the vehicle chassis to come into contact with the axles particularly when riding over bumps or road irregularities with possible damage to the vehicle and discomfort to passengers. Accordingly, these undesirable features have been overcome by compensating controls effective to maintain a substantially constant spacing between vehicle chassis and axle under great load variations.

In the past, many arrangements have been devised for accomplishing these ends and have included air springs such as cushions, bellows or piston-cylinder arrangements inflated with a suitable fluid and spaced between vehicle chassis and axles. In such arrangements valves have been provided for automatically charging the air springs under increased load and for discharging the same in response to decreased load. Such valves have in large measure been effective to accomplish their purposes but in most cases have been unduly complicated and made of numerous fragile parts susceptible to great wear, so as to render the same undesirable in that respect.

Accordingly, it is an object of this invention to provide a novel valve, operable in an automatic vehicle leveling system, that is simple and inexpensive in manufacture, durable and reliable, and effective to accomplish its assigned purpose.

It is another object of this invention to provide an automatic valve device having a pair of channels and being responsive to rotation of a cam in one direction a predetermined distance from an initial position, to open one channel while retaining a second channel closed and being responsive to rotation of the cam in reverse direction a predetermined distance from an initial position to open the second channel and retain the first channel closed.

It is another object of this invention to provide an automatic valve device having a pair of channels and being responsive to positioning of an actuating arm from a predetermined position thereof in one direction to open one channel while retaining a second channel closed and being responsive to positioning of the actuating arm from the predetermined position thereof in another direction to open the second channel and retain the first channel closed.

It is another object of this invention to provide an automatic valve device according to the last preceding object having a rocker arm pivotal by movement of said actuating arm a predetermined distance in either direction from an initial position to effect operation of channel controls and wherein movement of said rocker arm greater than said predetermined distance is accommodated by an overtravel apparatus including a torsion spring.

It is still another object of this invention to provide a valve device operable in an automatic leveling system for an automotive vehicle that is unresponsive to sudden, momentary differential spacings between vehicle frame and axle from a predetermined position to operate the valve.

Other and further objects and advantages will become apparent from a detailed description of the invention taken with the accompanying drawings in which:

Fig. 1 illustrates a fragmentary sectional view of a vehicle with an air spring having the present invention forming a part of the control system therefor;

Fig. 2 illustrates a cross-sectional view of the valve of Fig. 1 taken along section 2—2;

Fig. 3 illustrates a cross-sectional view of the valve of Fig. 2 taken along the section 3—3;

Fig. 4 illustrates a modification of a cam plate forming a part of this invention;

Fig. 5 illustrates a sensitive actuating linkage with overtravel for arm actuated valve according to a modification of the invention;

Fig. 6 illustrates a sectional view taken along section 6—6 of Fig. 5;

Fig. 7 illustrates an end view of the linkage shown in Fig. 5, and

Fig. 8 illustrates in perspective an anchor bushing employed in the invention.

It is to be understood that this invention comprehends the use of various compressible fluids other than air but that, for convenience, the same will be set forth and described with respect to an air system only.

Referring now more particularly to Fig. 1 of the drawings, 10 represents a vehicle frame supported above the vehicle axle 12 by a cross bar 14 pivotally secured at one end to a bracket 16 and pivotally secured to a lower portion of an air spring 18 at the other end. Bracket 16 and spring 18 are secured to frame 10 at the ends remote from their connections to cross bar 14. Axle 12 is supported between a pair of wheels, one of which is shown at 20.

An air supply chamber 22 is mounted on frame 10 at a suitable location for supplying air to air spring 18 under control of valve 24 which is also mounted on frame 10 and movable therewith. A valve actuating arm 26 extends from the valve body to a linking arm 28 pivotally secured at respective ends to the end of arm 26 and axle 12. A conduit 30 communicates between air supply chamber 22 and inlet of valve 24 and a conduit 32 communicates between the outlet of valve 24 and the interior of spring 18 which may be a bellows of a type well known.

Frame 10 is supported above axle 12 by the compressed air in spring 18 and in a vehicle of uniform load the static level of frame 10 above axle 12 varies according to the air pressure in spring 18. Similarly for uniform air pressure in spring 18, the level of frame 10 varies according to the load in the vehicle supported by frame 10. To maintain an even level of frame 10 with respect to axle 12, the air pressure in spring 18 is varied under the control of valve 14. Decreased spacing between frame 10 and axle 12 is effective through actuation of arm 26 to admit air into spring 18 from supply chamber 22 through valve 24 and increased spacing between frame 10 and axle 12 is effective through actuation of arm 26 to vent air spring 18 to atmosphere through valve 24 in a manner explained hereinbelow.

Referring now to Fig. 2 of the drawing, 34 represents the body or housing of valve 24. Housing 34 is provided with an inlet recess 36 having a shoulder 38 and a ball 40 engageable with shoulder 38 under the bias of a spring 42 bearing at one end against ball 40. The remote end of spring 42 is supported in a recess 44 in a nipple 46 threadedly engaging the recess 36. Nipple 46 is provided with a channel 47 in communication with recess 36 and is also provided with an internal thread 48 for attachment to conduit 30 leading from air supply chamber 22.

An aperture 50 in axial alignment with recess 36 extends from shoulder 38 through housing 34 and receives a pusher rod 52 engageable at one end with ball 40 and at the other end with a cam plate 54. A sealing O ring 55 surrounds pusher rod 52 intermediate its ends and engages the internal wall of aperture 50 to prevent the flow of air or other fluid therethrough.

A second recess 56 extending longitudinally along the housing 24 has a shoulder 58 for limiting the movement of a valve ball 60 under the biasing influence of a spring 62 bearing against the ball at one end and against the bottom of a recess 64 in a nipple 66 threadedly engaging the recess 56. Nipple 66 is internally threaded at 68 for attachment to conduit 32 and is provided with an aperture 70 in communication with recess 66.

An aperture 72 in axial alignment with recess 56 extends from shoulder 58 through housing 34 and receives a pusher rod 74 slidable along aperture 72 and engageable at one end with ball 60 and engageable at the other end with cam plate 54. A sealing O ring 76 is received in an annular groove in pusher rod 74 intermediate its ends and engages the internal wall of aperture 72 to prevent the flow of air or other fluid therethrough.

A cross channel 78 closed at its outer end by a removable plug 79 provides communication between aperture 50 adjacent ball 40 and with recess 56 and a vent channel 80 provides communication between aperture 72 adjacent ball 60 and ambient space.

An opening 82 is provided in one end face of housing 34 and receives a stud 84 secured in the housing by a pin extending through an aperture 86 extending transversely through stud 84 and adjacent portions of housing 34.

Cam plate 54 is mounted on stud 84 and is in contact with the ends of rods 52 and 74. One end of arm 26 is mounted about a flange of plate 54 and has a transverse hole 87 with opposed "flats" 88 for providing rotary driving engagement between arm 26 and cam plate 54. Suitable washers 90 are interposed between a portion of arm 26 and the flange of plate 54 and a nut 92 threadedly engaging the end of stud 84. Rotary movement of arm 26 is effective to drive cam plate 54 in a similar rotary movement to actuate pusher rods 52 and 74 in a manner to be explained.

Reference is now had to Fig. 3 together with Fig. 2 for a more detailed explanation of cam plate 54. Cam plate 54 is provided with a flange 94 extending about the end face of housing 34 and is provided with a generally flat surface 96 in which is a groove 98, of approximately semi-circular extent and shown more clearly in Fig. 3 of the drawing. The ends of pusher rods 52 and 74 are radially spaced from the longitudinal axis of the housing 34 and stud 84 and are engageable with groove 98 or surface 96 depending upon the rotary position of arm 26.

According to a modification of the invention as shown in Figure 4 of the drawings, a cam plate 54a may be provided having a flat face 96a with an arcuate cam ridge 100 of somewhat less than semi-circular extent and having a height substantially equal to the depth of groove 98 in cam plate 54. It is to be understood that ridge 100 is angularly positioned on cam plate 54a so as to correspond to the ungrooved portion of cam plate 54 of radius equal to the groove 98 thereof so as to provide an axial spacing between respective portions of the cam plate 54a the same as in the case of cam plate 54, for imparting axial thrusts to respective pusher rods.

In a normal static position of average load applied to the vehicle, the level of frame 10 with respect to axle 12 is such that ends of pusher rods 52 and 74 are disposed in respective ends of groove 98 in cam plate 54, permitting each of balls 40 and 60 to bear against respective shoulders 38 and 58 to prevent flow to or from air spring 18.

As may be understood from an observation of Fig. 1 of the drawings, a decreased spacing between frame 10 and axle 12 from normal static position as may result from vehicle loading, is effective to pivot arm 26 and cam plate 54 in a counter-clockwise direction as seen from exterior of the valve. Such pivotal movement of cam plate 54 is effective to cause flat surface 96 of the cam plate 54 to bear against and axially force pusher rod 52 against ball 40 to remove the same from engagement with shoulder 38. Consequently, air under pressure from tank 22 flows through conduit 30, aperture 47, recess 36, apertures 50 and 78, recess 56, aperture 70 and conduit 32 into air spring 18. Flow of air continues as described until air spring 18 expands sufficiently in response to air inflation to raise the level of frame 10 with respect to axle 12 to pivot arm 26 in a clockwise direction to cause a portion of groove 98 to align with and receive the end of pusher rod 52 and allow ball 40 to engage shoulder 38 to close the air supply valve. It is noted that during counter-clockwise rotation of cam plate 54, pusher rod 74 engages an arcuate portion of groove 98 and remains in a position allowing spring 62 to retain ball 60 against shoulder 58 to retain the air exhaust valve closed.

Under the influence of inflated spring 18, a decrease in loading subsequent to a loading of the vehicle greater than average is effective to cause a spacing between frame 10 and axle 12 to increase with respect to the normal static spacing to cause a pivotal movement of arm 26 in a clockwise direction as observed exteriorly. Such pivotal movement is effective to rotate cam plate 54 in a similar clockwise direction whereby groove 98 is moved out of alignment with pusher rod 74 which is axially driven along aperture 72 by flat surface 96 of cam plate 54 to remove ball 60 from its engagement with shoulder 58. It is noted that during clockwise rotation of cam plate 54, pusher rod 52 engages an arcuate portion of groove 98 and remains in a position to retain ball 40 against shoulder 38. As a consequence, air is permitted to flow from air spring 18 through aperture 70, recess 56, a portion of aperture 72 and vent 80 to ambient space to deflate spring 18 and reduce the quantity of air therein whereby the level of frame 10 is reduced.

It is noted that the balls 40 and 60 of the invention are responsive to pivotal movement of cam plate 54 to operate in appropriate sequence to admit air to spring 18 to correct for heavy load and to vent spring 18 to correct for load reduction and, further, that the balls 40 and 60 are never unseated simultaneously. Groove 98 in cam plate 54 allows considerable overtravel less than 180° by approximately the diameter of either push rod 52 or 74 after tripping of the quick opening ball check valves.

It is to be observed that this invention is equally applicable to other systems than that herein disclosed. As an example, a vacuum system employing sub-atmospheric pressures rather than high pressures is contemplated wherein communication between a vacuum source and a vacuum spring is controlled in a manner entirely similar to that set forth hereinabove. In such a modification a vacuum spring of suitable dimensions is substituted for air spring 18 in a manner that expansion rather than contraction of the spring results from load increases applied to the vehicle frame. The vehicle axle is rigidly linked to an upper portion of the spring and the vehicle frame is rigidly linked to a lower portion of the spring. Similarly, in this modification increased vacuum is applied to the diaphragm in response to increased loading through the check valve including ball 40 and seat 38 described above and vacuum is decreased in the spring by admitting air to the spring through the valve including ball 60 and its seat 58 in response to decreased loading on the vehicle frame whereby the average spacing between frame and axle is maintained substantially constant.

According to a modification of the invention a sensitive actuating linkage shown in Figs. 5, 6 and 7 is provided between actuating arm 26 and the body of a valve 24a for accommodating sudden, momentary movements of arm 26 without actuating valve 24a and for accommodating overtravel of arm 26 beyond position of full actuation of valve 24a without damaging the valve or other parts of the system.

According to this embodiment, a valve body 34a is provided with lateral flanges 102 and 104 through which respective bolts 106 and 108 pass for securing the valve body 34a to the frame 10. A further pair of spaced, similar flanges 110 and 112 extend from the vertical end face of the body of valve 34a and have a co-axial opening 114 therethrough. A rocker arm 116 is mounted between these flanges and is pivotal about a pin 115 which extends through the hole 114 and a like hole in the rocker arm itself. A spindle 118, preferably integral with rocker arm 116, extends axially away from the valve body for receiving and supporting various of the components of the sensitive actuating linkage. Spindle 118, is provided with a pair of bores 120 and 122 near axial extremities of the spindle and angularly displaced 180°, for receiving respective preload stop pins 124 and 126. A first spring anchor bushing 128 shown in perspective in Fig. 8 of the drawings, is mounted on spindle 118 near rocker arm 116 and is provided with a sectoral recess 130 for allowing limited angular movement thereof relative to stop pin 124. Additionally, bushing 128 is provided with a radial bore 154 for receiving a preload transfer pin 134 and is further provided with an axial bore 136 for receiving and anchoring one end of a torsion spring 138 coiled around spindle 118 and anchored at its opposite end in an axial bore 140 of a second anchor bushing 142 similar to bushing 128. Bushing 142 is also provided with a sectoral recess 144 for allowing limited angular movement thereof relative to stop pin 126 and is further provided with a radial bore 146 for receiving a preload transfer pin 148. A cylindrical hub 150, to which arm 26 is secured, is positioned about the anchor bushings, spring and pins and is fitted within an axial flange 152 on rocker arm 116. Hub 150 is provided with sectoral recesses 132 and 156 at axially opposed ends thereof and angularly displaced 180° for receiving and allowing limited angular movement of transfer pins 134 and 148 therein. A hub end cover 158 enclosing an end portion of the hub 150 is keyed to spindle 118 at 160 and is secured in position by a nut 162 threaded on the end of spindle 118.

In the assembly of the sensitive actuating linkage, the rocker arm is first mounted between the flanges 110 and 112 by pin 115. In sequential order, stop pin 124 is inserted in bore 120 at the spindle base, anchor bushing 128 with transfer pin 134 inserted in bore 154 is slipped over spindle 118 to the position shown in Fig. 5, spring 138 is slipped over spindle 118 and the spring end is inserted into bore 136 and anchor bushing 142 is slipped over spindle 118 receiving the other spring end in bore 140. Preload is then imposed on spring 138 by rotation of anchor bushing 142 to the point that stop pin 126 may be inserted in bore 122. Next, hub 150 is slipped over the described assembly and is received within flange 152 after which transfer pin 148 is positioned in bore 146 and end cap 158 is slipped over the end of hub 150 and secured there by nut 162 on the end of spindle 118.

The sensitive actuating linkage described and set forth is effective to actuate the poppets of valve 24a in response to slow or prolonged differentials in spacing of frame 10 and axle 12 from a predetermined optimum spacing but is effective to prevent actuation of the poppets in response to sudden and momentary differentials in such spacing from the predetermined optimum spacing. In addition, differential spacing between frame 10 and axle 12 greater than is sufficient to operate one of the poppets of valve 24a is accommodated by torsion spring 138 in the overtravel to prevent damage to any parts of the system.

For an understanding of the operation of the sensitive actuating linkage, it is first assumed that the level of frame 10 with respect to axle 12 is at a predetermined optimum desired value and that the level of frame 10 is lowered by loading of the vehicle. Accordingly, arm 26 together with hub 150, rocker arm 116 and parts within and secured to hub 150 are pivoted about pin 115 whereby the upper end of rocker arm 116 actuates poppet 52a to provide corrective influence to the air spring 18. In the event that the level of frame 10 is lowered to a point beyond that at which the end of the rocker arm 116 is caused to engage the housing 34a of valve 24a, as shown dotted in Fig. 5 of the drawing, the overtravel of arm 26 is accommodated by spring 138. In such circumstances, arm 26 is pivoted about the axis of hub 150, as is the hub 150 itself, and one shoulder of recess 156 engages transfer pin 148 to impart a torque to bushing 142 and the outer end of spring 138. The other end of the spring is anchored and angularly retained in position by stop pin 124. The overtravel of arm 26 is absorbed or accommodated in spring 138.

It is to be noted that overtravel of arm 26 in a clockwise direction as observed in Fig. 7 and resulting from decrease in load of the vehicle, is also absorbed by spring 138. Such overtravel subsequent to actuation of poppet stem 74a is effective to impart a torque from hub 150 to bushing 128 through a shoulder of recess 154 and transfer pin 134 whereby the end of spring 138 to the left as viewed in Fig. 4 is turned in a direction to wind up the spring. The right end of the spring is angularly retained by bushing 142 which under the circumstances is retained in angular position by stop pin 126.

Of course, when the frame 10 returns to its optimum level spring 138, arm 26, rocker arm 116 and other parts return to their initial positions.

It is observed that preloaded spring 138 is responsive to pivotal movement of arm 26 about the axis of hub 150, in either direction, to wind up against an angularly fixed anchor whereby overtravel of arm 26 is rendered innocuous.

As another feature of this embodiment of the invention, the inertia of the various components of the sensitive actuating linkage is porportioned relative to the constants of the valve poppet springs so that it is sufficiently large that sudden, momentary movements of arm 26 in either direction are absorbed or accommodated by spring 138 without the actuation of valve 24a. In response to road irregularities encountered while travelling in the vehicle, sudden, momentary pivotal movement about pin 115 is insufficient in magnitude to actuate the valve 24a and the constant of spring 138 and the inertia of the bushings and other components are small enough to allow spring 138 to wind up and accommodate such motion.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

I claim:

1. A control valve for an air spring suspension system for a vehicle comprising a valve body secured to the frame of the vehicle, said valve body having an end face, said valve body having a pair of spaced valve operating members slidably mounted therein and projecting beyond said end face, said valve body having a supporting bracket projecting from said end face between said valve operating members, a rocker arm pivotally mounted on said bracket on a pivot axis parallel to said end face, said rocker arm being proportioned to project laterally at each side of said pivot and overhang the projecting ends of said valve operating members, a spindle fixed to said rocker arm and projecting therefrom on an axis normal to the pivotal axis of the rocker arm, a sleeve surrounding said spindle and mounted on the spindle for limited rotary movement with respect to the spindle and resilient means interposed between said sleeve and said spindle resisting said limited rotary motion of the sleeve with respect to said spindle, an arm secured to the sleeve and projecting laterally from said sleeve, said arm being mounted at right angles to the axis of the sleeve, means connecting the outer end of said arm to the vehicle axle whereby movement of the axle with respect to the frame tilts said rocker arm about its pivot and moves one or the other of said valve operating members.

2. A control valve for a vehicle air spring comprising a valve body secured to the frame of the vehicle, said valve body having an end face, said valve body having a pair of spaced valve actuating members slidably mounted therein and projecting beyond said end face, said valve body having a supporting bracket projecting from said end face between said valve actuating members, a rocker arm pivotally mounted on said bracket on a pivot axis parallel to said end face, said pivot axis being spaced from said end face and said rocker arm proportioned to project laterally at each side of said pivot and overhang the projecting ends of said valve actuating members, a spindle fixed to said rocker arm and projecting therefrom on an axis normal to the pivotal axis of the rocker arm, a sleeve surrounding said spindle and mounted on the spindle for limited rotary movement with respect to the spindle and resilient means interposed between said sleeve and said spindle to transmit torque to the spindle, an arm projecting laterally from said sleeve and secured thereto, said arm being mounted at right angles to the rotary axis of the sleeve, means connecting the outer end of said arm to the vehicle axle whereby relative movement of the axle and frame tilts said rocker arm about its pivot and moves one or the other of said valve actuating members.

3. In a suspension system for supporting a vehicle frame in predetermined relation to the vehicle axis, an air spring interposed between the frame and the axle, a source of air under pressure, a leveling valve adapted to control the amount of air in said spring, conduit means connecting said valve to said pressure source and to said air spring, said valve having a body mounted on the frame above said axle, said valve body having a vertical end face, a first valve actuator mounted for reciprocation in the valve body mounted near the upper part of said vertical face, a second valve actuator mounted for reciprocation in the valve body near the lower part of said vertical face, said valve actuators having end portions projecting beyond said end face, a bracket carried by said valve body at said end face intermediate said first and second valve actuators, a rocker arm pivoted on said bracket, said rocker arm having oppositely extending portions overhanging the said projecting ends of said valve actuators, said rocker arm being pivoted on the bracket to turn about a horizontal axis parallel to said end face, a spindle fixed to said rocker arm and projecting therefrom at right angles to the said rocker arm portions overhanging the valve actuators, a hub surrounding said spindle, spring means interposed between said hub and said spindle whereby rotary motion of said hub in one direction winds said spring around said spindle, an arm fixed to the hub and projecting laterally at right angles with respect to the axis of the spindle, and means connecting the outer end of said arm to the axle whereby sudden movement of the axle relative to the frame is accommodated by said spring and slow movement of the axle relative to the frame turns said rocker arm about its pivot and moves one of said valve actuating members.

4. In a suspension system for supporting a vehicle frame in predetermined relation to the vehicle axis, an air spring interposed between the frame and the axle, a source of air under pressure, a leveling valve adapted to control the amount of air in said spring, conduit means connecting said valve to said pressure source and to said air spring, said valve having a body mounted on the frame above said axle, said valve body having an end face, a first valve actuator mounted for reciprocation in the valve body, a second valve actuator mounted for reciprocation in the valve body below said first valve actuator, said valve actuators having end portions projecting beyond the valve body, a bracket carried by said valve body at said end face intermediate said first and second valve actuators, a rocker arm pivoted on said bracket, said rocker arm having portions extending from the pivot and overhanging the said projecting end portions of said valve actuators, said rocker arm being pivoted on the bracket to turn about its axis and move one or the other of said valve actuators, a spindle fixed to said rocker arm and projecting therefrom at right angles to the rocker arm portions overhanging the valve actuators, a hub surrounding said spindle, spring means interposed between said hub and said spindle, an arm fixed to the hub and projecting laterally at right angles with respect to the axis of the spindle, and means connecting the outer end of said arm to the axle whereby sudden movement of the axle relative to the frame is accommodated by said spring and slow movement of the axle relative to the frame turns said rocker arm about its pivot and moves one of said valve actuating members.

5. In a suspension system for a vehicle, an air spring, a source of air under pressure, a leveling valve for introducing air under pressure to said spring upon movement of the frame and axle toward each other and exhaust air from said spring in response to movement of the axle away from the frame, conduit means connecting said valve to said pressure source and to said air spring, said leveling valve comprising a valve body secured to the frame, said valve body having upper and lower valve actuating members mounted for movement in the valve body, said actuating members having an end thereof projecting beyond the valve body, a rocker arm pivoted on a horizontal axis on said valve body intermediate said valve actuating members, said rocker arm having oppositely disposed portions to overhang the ends of said valve actuating members whereby movement of the rocker arm about its pivotal axis in one direction moves one of said actuators into said valve body and movement of the rocker arm about its pivotal axis in an opposite direction moves the other of said valve actuators into said valve body, a spindle carried by said rocker arm extending therefrom normal to the pivot axis of the rocker arm, a cylindrical hub journalled on the rocker arm, said hub having lost motion slots at opposite ends thereof, said hub having an arm fixed thereto and extending laterally therefrom normal to the axis of said spindle, means to connect the outer end of said arm to the vehicle axle, radially extending pins carried by said spindle at opposite ends thereof within said hub, a first lost motion sleeve within said hub adjacent one of said radial pins and a second lost motion sleeve within said hub adjacent said other radially extending pin, a coil spring around said spindle having the opposite ends thereof anchored in said sleeves, radially extending pins carried by each of said sleeves at their outer periphery projecting into said lost motion slots in said hub whereby movement of the vehicle axle relative to the frame rotates said hub and through said spring biases said rocker arm about its pivotal mounting to effect actuation of one or the other of said valve actuating members.

6. In a suspension system for a vehicle, an air spring, a source of air under pressure, a leveling valve for introducing air under pressure to said spring upon movement of the frame and axle toward each other and exhaust air from said spring in response to movement of the axle away from the frame, conduit means connecting said valve to said pressure source and to said air spring, said leveling valve comprising a valve body secured to the frame, said valve body having vertically spaced valve actuating members mounted for movement in the valve body, said actuating members having an end thereof projecting outwardly of the valve body, a rocker arm pivoted on a horizontal axis intermediate said valve actuating members, said rocker arm having oppositely disposed portions to overhang the ends of said valve actuating members whereby movement of the rocker arm about its pivotal axis in one direction moves one of said actuators into said valve body and movement of the rocker arm about its pivotal axis in an opposite direction moves the other of said valve actuators into said valve body, a spindle carried by said rocker arm extending therefrom normal to the pivot axis of the rocker arm, a cylindrical hub journalled on the rocker arm, said hub having openings at each end thereof, said hub having an arm fixed thereto and extending laterally therefrom normal to the axis of said spindle, means to connect the outer end of said arm to the vehicle axle, radially extending pins carried by said spindle at opposite ends thereof within said hub, a first lost motion sleeve within said hub adjacent one of said radial pins and a second lost motion sleeve within said hub adjacent said other radially extending pin, a coil spring around said spindle having the opposite ends thereof engaged with said sleeves, radially extending pins carried by each of said sleeves at their outer periphery projecting into said openings in said hub whereby movement of the vehicle axle relative to the frame rotates said hub and through said spring biases said rocker arm about its pivotal mounting to effect actuation of one or the other of said valve actuating members.

References Cited in the file of this patent

UNITED STATES PATENTS

| | | |
|---|---|---|
| 2,670,201 | Rossman | Feb. 23, 1954 |
| 2,844,386 | Pribonic | July 22, 1958 |

FOREIGN PATENTS

| | | |
|---|---|---|
| 209,879 | Great Britain | Jan. 24, 1924 |